(12) United States Patent
Tran

(10) Patent No.: US 9,658,857 B2
(45) Date of Patent: May 23, 2017

(54) METHOD AND APPARATUS FOR PROCESSOR TO OPERATE AT ITS NATURAL CLOCK FREQUENCY IN THE SYSTEM

(76) Inventor: Thang Tran, Saratoga, CA (US)

(*) Notice: Subject to any disclaimer, the term of this patent is extended or adjusted under 35 U.S.C. 154(b) by 373 days.

(21) Appl. No.: 13/555,178

(22) Filed: Jul. 22, 2012

(65) Prior Publication Data

US 2012/0317434 A1    Dec. 13, 2012

(51) Int. Cl.
*G06F 1/00* (2006.01)
*G06F 1/04* (2006.01)
*G06F 1/12* (2006.01)
*H04L 7/00* (2006.01)
*G06F 9/38* (2006.01)
*G06F 1/10* (2006.01)

(52) U.S. Cl.
CPC ............. *G06F 9/3871* (2013.01); *G06F 1/10* (2013.01)

(58) Field of Classification Search
CPC ................................ G06F 9/3871; G06F 1/10

USPC ................ 713/400, 401, 500, 501, 503, 600
See application file for complete search history.

(56) References Cited

U.S. PATENT DOCUMENTS

| | | | | |
|---|---|---|---|---|
| 5,199,107 A * | 3/1993 | Ozawa | ......................... | 713/400 |
| 5,625,806 A * | 4/1997 | Kromer | ......................... | 713/501 |
| 5,802,356 A * | 9/1998 | Gaskins et al. | ............... | 713/500 |
| 5,987,620 A * | 11/1999 | Tran | ......................... | G06F 1/10 |
| | | | | 712/E9.062 |
| 6,065,126 A * | 5/2000 | Tran et al. | .................... | 713/401 |
| 7,039,146 B2 * | 5/2006 | Chiu | ............................. | 375/373 |

* cited by examiner

*Primary Examiner* — Mark Connolly (57) ABSTRACT

A mechanism to generate a self-clock within a synchronous processing unit of an asynchronous digital device. The self-clock is designed to match the worst-case delay of pipeline processing unit in such a way that the pipeline processing unit is operate at its own natural clock frequency and shutting off when there is no valid data to process. The synchronization logic of the processing unit consists of self-clock that generates output clock to synchronize with the internal clock edge if the processing unit is active or synchronize with the input clock edge if the processing unit is inactive.

12 Claims, 6 Drawing Sheets

METHOD AND APPARATUS FOR PROCESSOR TO OPERATE AT ITS NATURAL CLOCK FREQUENCY IN THE SYSTEM

FIELD OF THE DISCLOSURE

The present disclosure relates to digital systems (such as mobile devices, processors, memory devices, and computer systems) and, more particularly, to mechanisms and techniques for clocking mechanism of the digital designs.

BACKGROUND

In general, microprocessors (processors) achieve high performance by executing multiple instructions per clock cycle and by choosing the shortest possible clock cycle. The term "clock cycle" refers to an interval of time accorded to various stages of processing pipeline within the microprocessor. Storage devices (e.g. registers and arrays) capture their values according to a rising or falling edge of a clock signal defining the clock cycle. The storage devices store the values until a subsequent rising or falling edge of the clock signal, respectively. The phrase "instruction processing pipeline" is used herein to refer to the logic circuits employed to process instructions in a pipeline fashion. Although the pipeline may include any number of stages, where each stage processes at least a portion of an instruction, instruction processing generally includes the steps of: decoding the instruction, fetching data operands, executing the instruction and storing the execution results in the destination identified by the instruction.

Processor design consists of a central clock, generally phase lock loop (PLL) clock, with a clock tree network. The clock tree consists of many global clock buffers and local clock buffers. The clock buffers can be clock-gated to save power but the clock tree itself can still consume much power. In some estimate, the clock tree can consume 15% to 35% of total dynamic power of the processor. The distributed clock networks with local clock generators can significant reduce the power consumption of microprocessor as suggested in U.S. Pat. No. 5,987,620. Unfortunately, at system level, the clocking network is still inefficient with a single PLL clock or multiple PLL clocks. The globally-asynchronous-locally-synchronous (GALS) clocking allows the system modules to operate at different clock frequencies but these clock frequencies are still fixed by PLL clocks.

BRIEF DESCRIPTION OF THE DRAWINGS

The present disclosure may be better understood, and its numerous features and advantages made apparent to those skilled in the art by referencing the accompanying drawings. Embodiments of the present disclosure are illustrated by way of examples and are not limited by the accompanying figures, in which like references indicate similar elements. The use of the same reference symbols in different drawings indicates similar or identical items. Elements in the figures are illustrated for simplicity and clarity and have not necessarily been drawn to scale.

SUMMARY

The problems outlined above are in large part solved by a design in accordance with the various embodiments of this disclosure. Embodiments of this disclosure are adaptable for use in any Mobile Device, computer systems, or other digital designs.

In particular, the disclosure contemplates on using the self-clock mechanism that will conditionally generate clocks when there is a valid operation to be performed. The self-clock modules are used for internal of the processing unit as well as in the interface block of the processing unit for communication with other processing units. The interface block includes asynchronous buffers to allow the processing unit to receive and send data to other processing units with different clock frequencies. The self-clock modules within a processing unit are designed to operate at the same clock frequency which matches the worst case speed path or the target frequency of the processing unit. This mechanism will enable a power reduction mechanism at the processor level as well as system level. The system can include many cores such as a general-purpose microprocessor, a DSP, a peripheral device, an I/O device, a hardware accelerator, and memory modules. Instead of using a single or multiple PLL clocks to force these cores and memory modules to operate at certain clock frequencies, the cores and memory modules should operate at their own natural clock frequencies. The natural clock module is designed in accordance with the design technology which matches the frequency of the pipeline operation of the processor.

This disclosure provides various embodiments of mechanisms to generate clock only when there is a need to perform a valid operation.

A further understanding of the nature and advantages of the present disclosure may be realized by reference to the remaining portions of the specification and the drawings.

DETAILED DESCRIPTION

Figure 1:
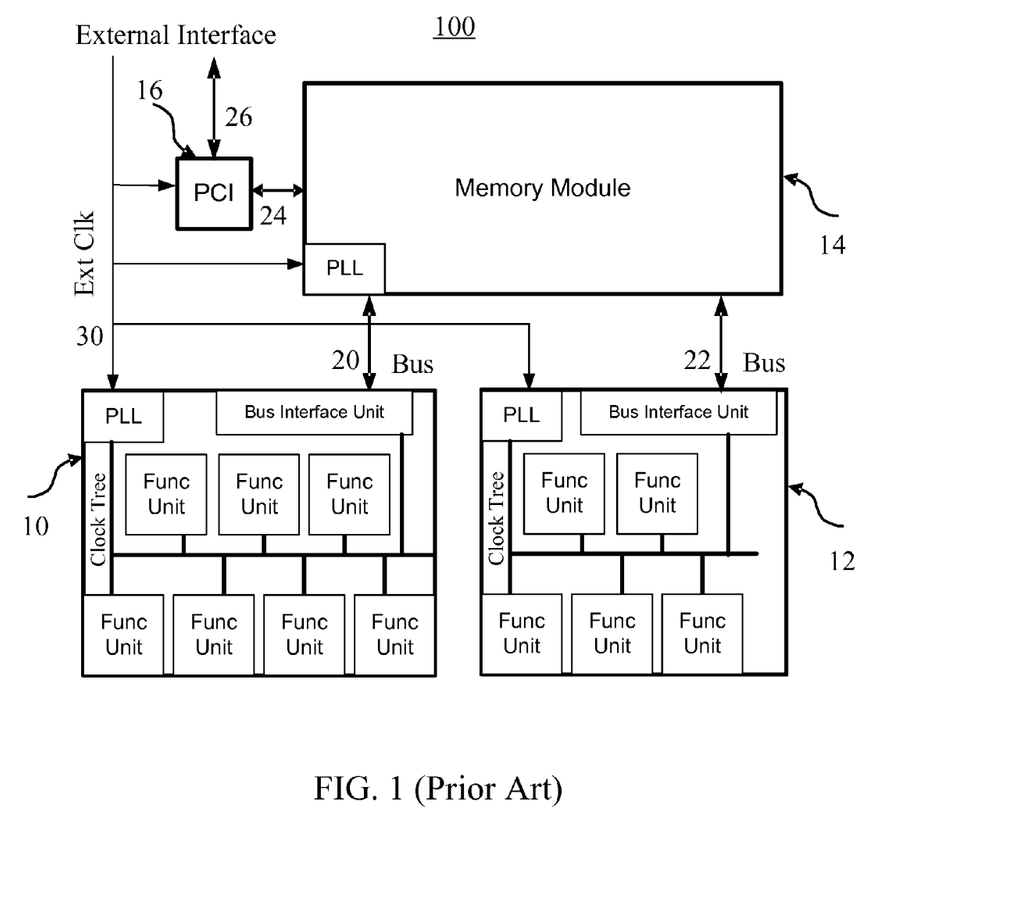
FIG. 1 is a block diagram of an embodiment of a prior-art computer processing system in accordance with the present disclosure.

FIG. 1 illustrates a prior-art processing device 100 that includes a memory module 14, a processor 10, another processor 12, and a PC interface unit 16. Memory module 14 is connected through bidirectional bus 20 to the processor 10, bidirectional bus 22 to the processor 12, and bidirectional bus 24 to the PC interface unit 16. Processors 10 and 12 receive instructions and data from memory module 14 through buses 20 and 22, respectively. The memory module 14 may include memory controller to direct I/O requests from processors 10 and 12 to PC interface unit 16 through bus 24. In addition, memory module 14 can also access external memory through PC interface unit 16. Bidirectional buses 20, 22, 24, and 26 can consist of 2 sets of unidirectional buses. Other I/O handlers/interfaces, and peripheral devices and modules (not shown) can bi-directionally couple to buses 20, 22, and 24 to allow communication between the components.

PC interface unit 16 communicates with external devices (not shown) through bidirectional bus 26. Processing unit 100 receives an external clock 30 in which PC interface unit 16 can synchronize with external devices in transferring data. The external clock 30 connects to the PLL clocks of processor 10, processor 12, and memory module 14. The PLL clocks generate internal clocks at different clock frequencies for processor 10, processor 12, and memory module 14. In another configuration, the PLL clocks can be generated from an external clock module instead of internal to the processors or memory modules.

In the processor 10, the PLL clock frequency can be multiple of clock frequency of the external clock 30. The internal clock of processor 10 connects to a clock tree to supply clock to all internal functional units and bus interface unit. Similarly, the PLL clock of processor 12 connects to the clock tree to supply the clock to its internal functional unit and bus interface unit. Memory module 14 may use the PLL clock in different manner than processor 10 and processor 12. One such purpose is multiple internal clocks with different clock frequencies for internal SRAM or DRAM arrays and I/O interfaces with processor 10, processor 12, and PC interface unit 16.

In alternate embodiment, processing device 100 may include any number of processors, hardware accelerators, and I/O devices. In another embodiment, the processor 10 may be a general-purpose microprocessor and processor 12 may be a DSP processor or graphic unit. The memory module 14 may include memory modules and hierarchical memory subsystem for processors 10 and 12.

Figure 2:
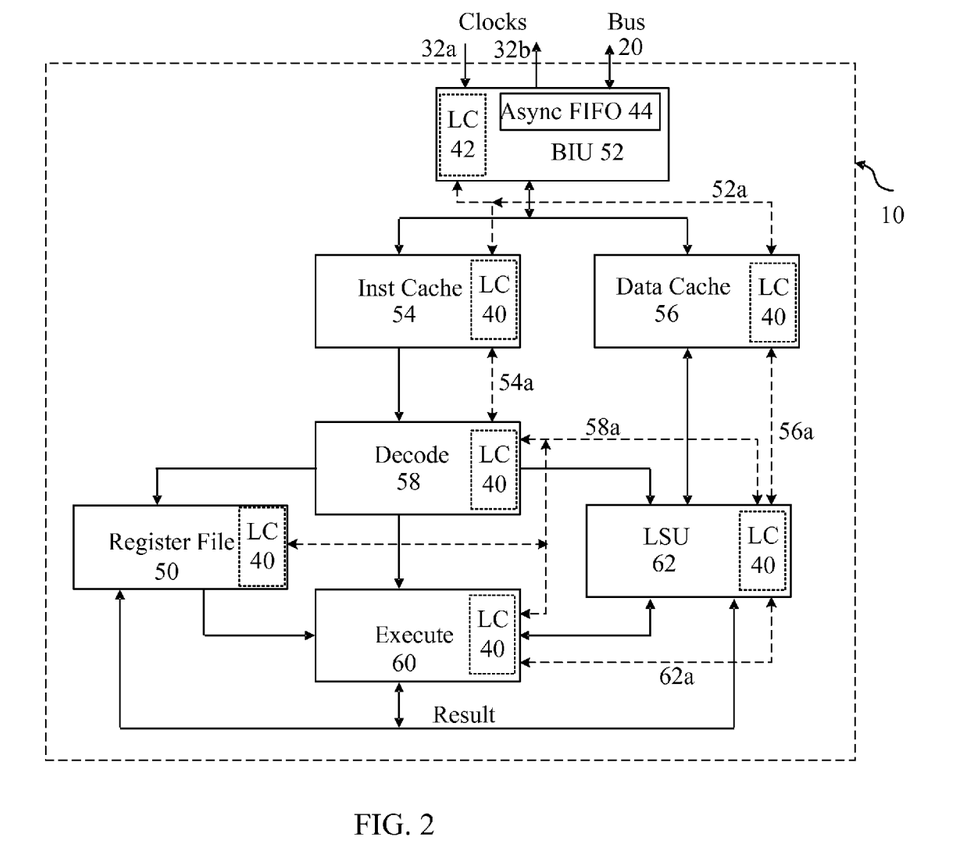
FIG. 2 is a block diagram of an embodiment of implementing distributed clock locking mechanism for a microprocessor of the present disclosure.

FIG. 2 is a diagram of an embodiment of instruction handling components that can be included in a processor 10 of FIG. 1 with distributed local clock generators in accordance with the present disclosure. In this illustrated example, the processor 10 includes bus interface unit (BIU) 52, instruction fetch and cache unit 54, instruction decode unit 58, register file 50, execute unit 60, load store unit (LSU) 62, and data cache unit 56. The execute unit 60 may include branch execution, simple integer execution, complex integer execution, floating point execution, and SIMD execution. The PLL clock and the clock tree network as shown for processor 10 of processing unit 100 in FIG. 1 are replaced with local clock generators 42 and 40.

Traditionally, each of the functional units constitutes one or more pipeline stages in a processor. A first instruction is fetched from instruction cache 54 during a clock cycle, during the next clock cycle, the first instruction will be in the decode unit 58 while a second instruction is being fetched from the instruction cache 54. Thus pipelining enables simultaneous operation of multiple instructions. In general, number of pipeline stages increases with design complexity and high clock frequency. The term clock frequency refers to number of clock cycles within a time unit, usually a second.

In FIG. 2, the functional units in processor 10 are shown with locally generated self-clock modules 40; the terms local clock and self-clock are used interchangeably. Local clock (shown in FIG. 2 with postscript 'a' such as 54*a*) of each unit synchronizes with its neighbors. BIU 52 generates local clock that synchronizes with local clocks from instruction cache 54 and data cache 56 through local-clock 52*a*. Instruction cache generates local clock that synchronizes with local clock from BIU 52 through local-clock 52*a* and local clock from decode unit 58 through local-clock 54*a*. Similarly, data cache 56 generates local clock that synchronizes with local clock from BIU 52 through local-clock 52*a* and local clock from LSU 62 via local-clock 56*a*. Decode unit 58 generates local clock that synchronizes with local clock from instruction cache 54 via local-clock 54*a* and local clocks from register file 50, execution unit 60, and LSU 62 through local-clocks 58*a*. Register file 50 in turn generates local clock that synchronizes with local clocks from decode unit 58 and execution unit 60 through local-clocks 58*a*. Execution unit 60 generates local clock that synchronizes with local clocks from decode unit 58, register file 50 through local-clock 58*a*, and local clock from LSU 62 through local-clock 62*a*. LSU 62 generates local clock that synchronizes with local clock from data cache 56 through local-clock 56*a*, local clock from execution unit 60 through local-clock 62*a*, and local clock from decode unit 58 through local clock 58*a*. For simplicity, a single bidirectional bus is shown in connection to many units. The local-clocks 52*a*, 54*a*, 56*a*, 58*a*, and 62*a* consist of unidirectional clock signals, feedback clocks, enable signals, and active signals. The self-clock modules 40 and 42 use local clocks and feedback clocks to synchronize the clock edges as in synchronous design. In addition, the active signals generated by the local clock modules 40 are combined and routed back to the BIU 52. The BIU 52 generates local clock 52*a* differently depended on whether processor 10 is active or idle.

FIG. 2 shows local clock module 42 in BIU 52 and local clock modules 40 located in the functional units, instruction cache 54, data cache 56, decode 58, register file 50, execute 60, or LSU 62. The clock modules 40 and 42 are designed to operate at the same clock frequency based on the worst delay timing or the desired target frequency of the processor 10. For memory storage device, the worst delay timing might be the SRAM or DRAM operating frequency. In one embodiment, the programmable inverter chain is used to match the worst pipeline delay and set the clock frequency of the processor. The local clock modules are distributed throughout processor 10 instead of the centralized clock in traditional processor design. The central clock consists of a clock tree with many hierarchical levels and many local clock buffers as leaves. In the present invention, the local clock modules are leaves without the clock tree, branches, and central PLL clock. The local clock modules include mechanism to synchronize the clock edges as in synchronous design with the advantages of less power. The local clock module 40 is enabled only when there is valid data input. Each local clock module receives an input clock to enable its clock to generate an output clock pulse. In each functional unit, the local clock module 40 can be duplicated based on loading and functionality. The local clock module generates the clock pulse to capture the data from its own functional block. All local clock modules 40 are designed with same delay chain to operate at the same clock frequency. The delay chain of the local clock module 40 is programmable and can be individually adjusted to account for process variation from different locations on the die.

The local clock module 42 in BIU 52 is slightly different from the local clock modules 40 because of interfacing with external devices at different clock frequency. The BIU 52 receives clock signals and output data from instruction cache or data cache and generates output clock signal 32*b* for external devices. The local clock module 42 in BIU 52 also receives input clock signal 32*a* and input data on bus 20 from external device to generate internal clock signal 52*a*. Since the processing unit 10 in FIG. 1 can operate at different clock frequency than other processing units such as memory module 14, BIU 52 includes an asynchronous FIFO 44 to interface with other processing units. Data are queued and synchronized in both directions.

Figure 3:
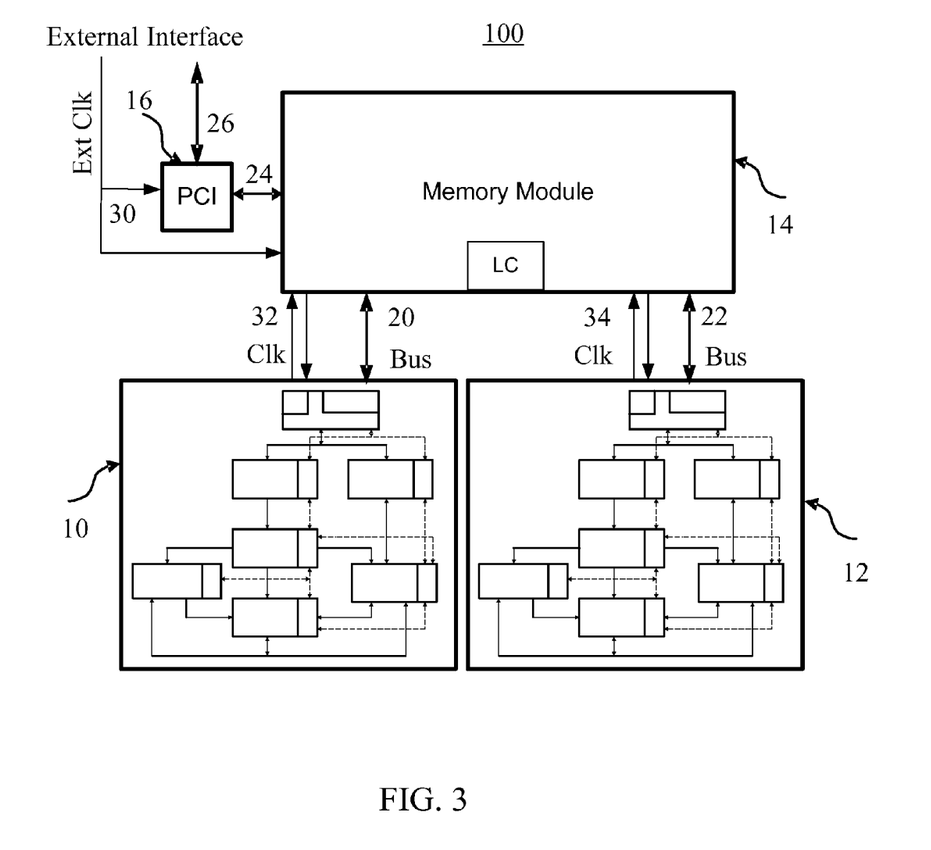
FIG. 3 is a block diagram of an embodiment of a computer processing system in accordance with the present disclosure.

Referring now to FIG. 3, the processing device 100 in FIG. 1 is modified with new clock distribution and clock configurations in accordance with the present invention. PCI unit 16 interconnection remains the same because it needs the same interface to external devices. PCI unit 16 connects to external device using external clock 30 and bus 26, and connects to memory module 14 via bus 24. The external clock 30 is no longer connected to processors 10 and 12. The memory module 14, processors 10 and 12 generate their own local clock to operate at their own natural clock frequency. The memory module 14 synchronizes with processor 10 through clock signals 32 and with processor 12 through clock signals 34. The bidirectional bus 20 from memory module 14 to processor 10 and bidirectional bus 22 from memory module 14 to processor 12 remains the same. As in FIG. 1, the clock signals 32 and 34 can be at the same clock frequency or at different clock frequencies. Internally to the memory module 14, processors 10 and 12, asynchronous FIFO's are used to synchronize data with different input clock frequencies to its own clock frequency. Memory module 14 also receive external clock 30 so that it can generate data on bus 24 with respected to external clock 30 for interfacing with PCI unit 16.

Figure 4:
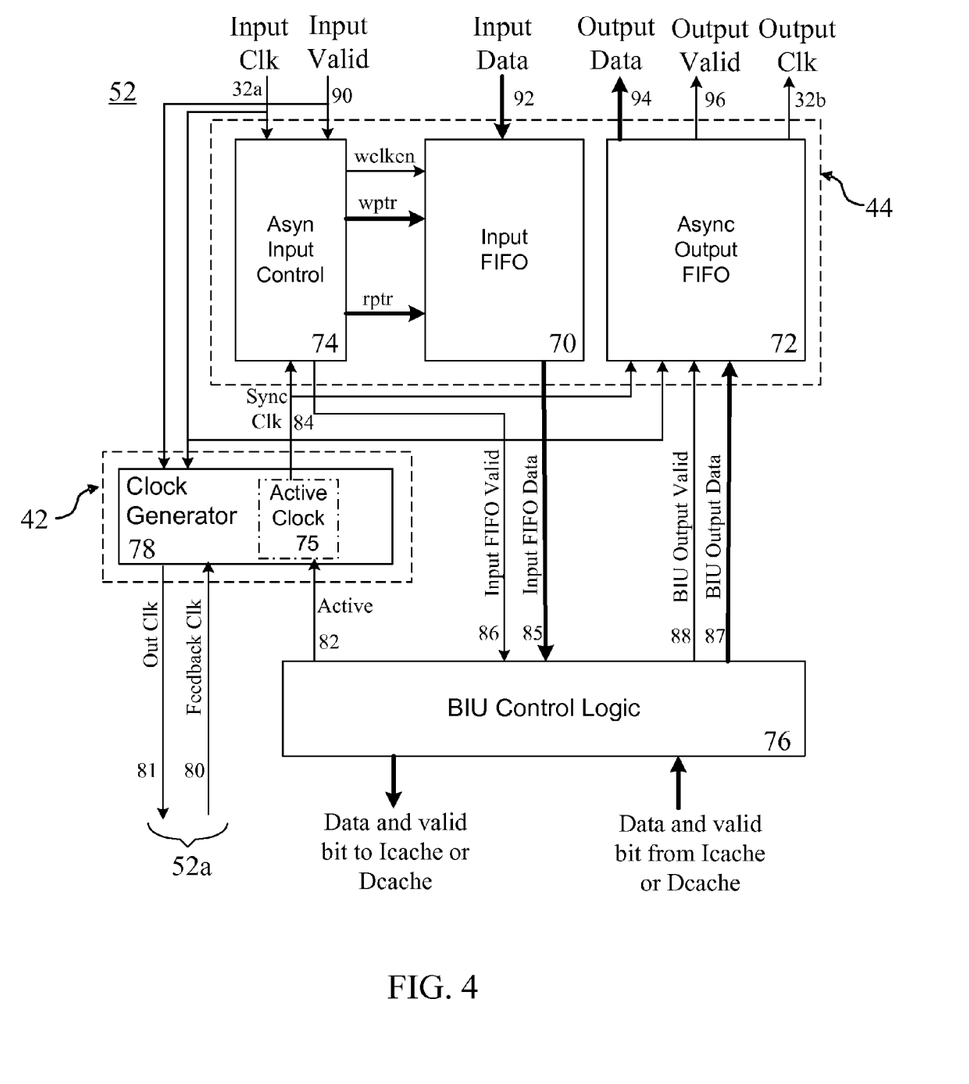
FIG. 4 is a block diagram of an asynchronous FIFO and clock generation within a bus-interface unit in accordance with the present disclosure.

Turning now to FIG. 4, the asynchronous FIFO 44 of BIU 52 in the processing unit 10 is shown. This asynchronous FIFO can also be used for memory module 14 and processor 12. The asynchronous FIFO 44 consists of asynchronous input control block 74, input FIFO 70, and asynchronous output FIFO 72. The FIFO can be implemented with shift registers or circular registers. Inputs to the asynchronous control block 74 consist of input clock 32a and input valid 90 from external devices, and sync clock 84 from locally generated clock 42. As input valid 90 is received, the asynchronous control block generated write enable (wclken) based on input clock 32a and write pointer (wptr) to write input data 92 into input FIFO 70. Through synchronization with sync clock 84, the asynchronous control block 74 generates input FIFO valid 86 and read pointer (rptr) to read input FIFO data 85 to BIU control logic 76. The synchronization may take couple clock cycles of sync clock 84 to generate input FIFO valid 86 and data 85. In addition, the asynchronous control may generate FIFO full signal (not shown) to the external device when the FIFO is full.

The asynchronous output FIFO 72 received BIU output valid 88 and data 87 and used sync clock 84 to buffer the data before sending out to external device. The asynchronous output FIFO 72 can be a simple buffer to send output data to external device when external device is not busy or full. The output clock 32b is based on sync clock 84 and sent along with output valid 96 and output data 94 to external device. In another embodiment, the asynchronous output FIFO 72 may consist of a control block and FIFO as shown for input data. In this case, the sync clock 84 must synchronized with the clock edge of input clock 32a to generate output valid 96 and output data 94. For example, the memory module 14 can use this mechanism to send data PCI 16 in FIG. 3.

The input FIFO data 85 are consumed by BIU control logic 76 and processor 10 using internal clock generator 78. The input clock 32a and valid signal 90 enables the clock generator 78 to activate output clock 81 for sending valid data to either instruction cache 54 or data cache 56. The clock generator 78 is part of the self-clock module 42 which generates the natural clock frequency of processor 10. The input FIFO valid 86 from asynchronous control block 74 is sent to BIU control logic 76 to steer input FIFO data 85 to instruction cache 54 or data cache 56. The output clock 81 is sent to local clock modules 40 of instruction cache 54 and data cache 56 along with input FIFO valid 86 and data 85. Output clock 81 is part of the clock bus 52a. The clock bus 52a also includes feedback clock 80 and active signal 82. The feedback clock 80 and active signal 82 indicates that instruction cache 54 or data cache 56 is not idle. In absence of input valid 90, the active signal 82 is used to shut down the clock generator 78 to save power. The active clock module 75 will continuously generate clock signal that is synchronous with the internal clock of processor 10. In one embodiment, the sync clock 84 and the output clock 81 are from the same self-clock module with different enable signals internal to the clock generator 78. The BIU control logic 76 receives requests from instruction cache 54 and data cache 56 and sends BIU output data 87 and valid 88 to external devices via asynchronous output FIFO 72.

The clock generator 78 includes an active clock module 75. The output clock 81 and sync clock 84 operate at the same frequency and match with the worst pipeline delay of processor 10 which is the natural clock frequency of processor 10. Output clock 81 is generated differently depended on the state of the processor 10. If the processor 10 is active, then the output clock 81 is generated from sync clock 84. The active clock module 75 continuously generates the sync clock 84 when processor 10 is active. Clock generator 78 uses this sync clock 84 to generate output clock 81. When the processor 10 is idle (the active clock module 75 is disabled), upon receiving valid external input data 90, the active clock module 75 is enabled and clock generator 78 generates output clock 81 and sync clock 84 based on the clock edge of input clock 32a. In another embodiment, the clock generate 78 can randomly generate an output clock 81 and sync clock 84.

Yet, in another embodiment, the active clock module 75 is active based solely on the feedback clocks 80 from instruction cache 54 and data cache 56. The output clock 81 and sync clock 84 are synchronized with the clock edge of feedback clock 80. The feedback clocks 80 are generated when instruction cache 54 is active, or data cache 56 is active. It is a combination of both active clock 54a of instruction cache 54 and active clock 56a of data cache 56.

Figure 5:
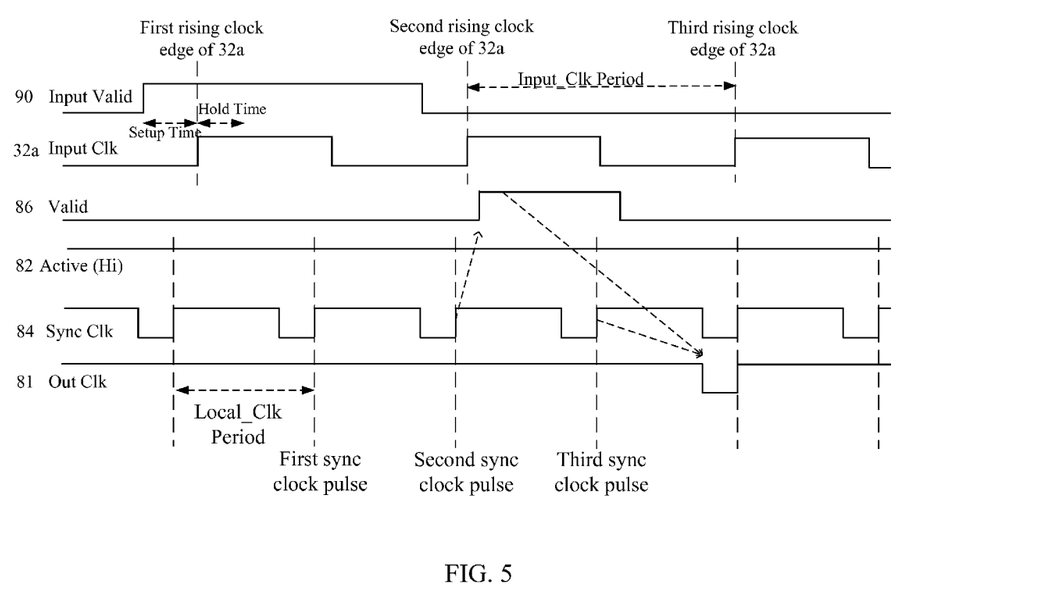
FIG. 5 is a timing diagram for generating internal clock signal when the processing unit is active in accordance with the present disclosure.

FIG. 5 is the timing diagram of clock generation by local clock 42 of BIU 52 when processor 10 is active. Since processor 10 is active, the clock pulse generated by local clock 42 must be synchronized with the internal clock 84 of active clock module 75. In the timing diagram, input valid signal 90, input data 96 (not shown) and input clock 32a from an external device (i.e. memory module 14) are received by BIU 52 of processor 10. The input valid signal 90 should meet the setup and hold times of input clock 32a. The output valid signal 86 of asynchronous control block 74 transitions to Hi value after synchronizing with internal clock 84. Note that for most asynchronous interface, the synchronization takes three cycles of internal clock 84. In this example, only one valid data packet 90 and 92 is received by BIU 52. The valid signal 90 is Lo value for the second and third rising clock edges of input clock 32a. Active signal 82 has Hi value indicating processor 10 is active and the clock pulse 84 is the synchronous internal clock of processor 10. The clock generator 78 uses feedback clock 80 from instruction cache 54 and data cache 56 in combination with sync clock 84 to generate a output clock 81. Output clock signal 81 has only 1 clock pulse since there is only 1 valid packet of data. The clock modules 42 and 40 of functional units in processor 10 are coupled through a chain of synchronized local clocks. For example, in FIG. 2, if the decode unit 58 is active, then the instruction cache 54 uses the feedback clock from decode unit 58 to generate a feedback clock 80 to BIU 52. The clock generator 78 and active clock 75 use feedback clock 80 to generate output clock 81 and sync clock 84. Output clock 81 and sync clock 84 are synchronized with feedback clock 80.

Figure 6:
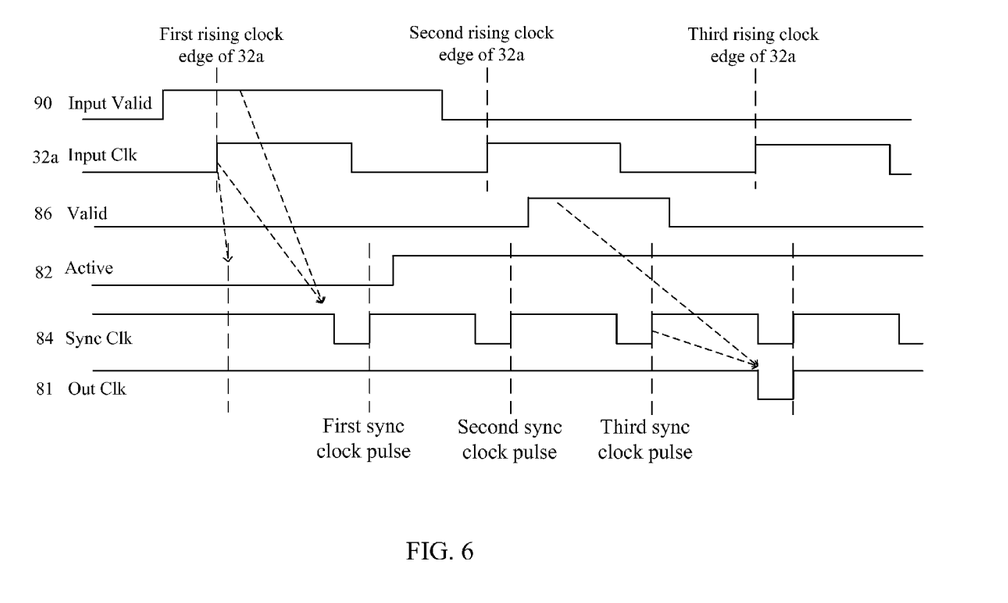
FIG. 6 is a timing diagram for generating internal clock signal when the processing unit is inactive in accordance with the present disclosure.

Turning now to FIG. 6, the input valid 90 and input clock 32a are the same as in timing diagram of FIG. 5. The active signal 82 is Lo value which means that processor 10 is inactive. The clock generator 78 of BIU 52 generates sync clock 84 based on the rising edge of input clock 32a. All internal clocks, including output clock 81, of processor 10 will synchronize with this sync clock 84.

The above examples in FIGS. 5 and 6 showed internal clock frequency is higher than external clock frequency. The asynchronous FIFO 44 can also be designed for the same or slower internal clock frequency. The number of registers in input FIFO may be increased and full/busy signals can be added to provide proper synchronization between processing units of processing device 100.

Some of the above embodiments, as applicable, may be implemented using a variety of different information processing systems. For example, although FIG. 1 and the discussion thereof describe an exemplary information processing architecture, this exemplary architecture is presented merely to provide a useful reference in discussing various aspects of the disclosure.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

In one embodiment, the local-clocks of this disclosure is applicable to all digital ICs like custom chip, Application Specific IC (ASIC), Field Programmable Gate Array (FPGA). It is applicable to practically any digital design such as processing units, memory systems, communication system, and I/O systems.

In one embodiment, system 100 is a computer system such as a personal computer system. Other embodiments may include different types of computer systems. Computer systems are information handling systems which can be designed to give independent computing power to one or more users. Computer systems may be found in many forms including but not limited to mainframes, minicomputers, servers, workstations, personal computers, notepads, personal digital assistants, electronic games, automotive and other embedded systems, cell phones and various other wireless devices. A typical computer system includes at least one processing unit, associated memory and a number of input/output (I/O) devices.

Although the disclosure is described herein with reference to specific embodiments, various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to disclosures containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

The invention claimed is:

1. A digital circuitry comprising:
   a first processing unit wherein the first processing unit generates a first clock; and
   a second processing unit that receives the said first clock comprising of a self-clock circuitry that generates an internal clock;
      wherein the said self-clock circuitry further comprises of:
         a mechanism to generate a first output clock that synchronizes with the internal clock;
         a mechanism to generate a second output clock that synchronizes with the first clock from the first processing unit; and
         a mechanism to generate a select between the first output clock and the second output clock to generate an output clock.

2. The apparatus of claim 1, wherein the second processing unit further comprises of a first-in-first-out register to receive a data from the first processing unit.

3. The apparatus of claim 2, wherein:
   the first clock from the first processing unit is at a faster clock frequency in comparison to the internal clock frequency of the self-clock circuitry of the second processing unit wherein an acknowledge signal is needed to avoid overrun of the first-in-first-out register.

4. The apparatus of claim 3, wherein the output clock from the self-clock circuitry of the second processing unit is used to read a data from the first-in-first-out register.

5. The apparatus of claim 1, wherein the self-clock circuitry of the second processing unit continuously generates the internal clock as long as there is a valid operation within the second processing unit.

6. The apparatus of claim 1, wherein the second processing unit comprises of a second self-clock circuitry; wherein the second self-clock circuitry generates an output clock that:
  has the same clock frequency with the internal clock of the first self-clock circuitry of the second processing unit; and
  synchronizes with the internal clock of the first self-clock circuitry of the second processing unit.

7. The apparatus of claim 1, wherein the second processing unit is a memory storage device.

8. The apparatus of claim 1, wherein the self-clock circuitry of the second processing unit further comprises of:
  a mechanism to generate a third output clock that synchronizes with an internal feedback clock within the second processing unit; and
  a mechanism to generate a select between the first output clock, the second output clock, and the third output clock to generate an output clock.

9. The apparatus of claim 1, wherein the self-clock circuitry of the second processing unit further comprises of:
  an active indication to generate the output clock; and
  an idle indication to generate no clock.

10. The apparatus of claim 1, wherein the internal clock period is designed to match a target clock frequency of the second processing unit.

11. The apparatus of claim 1, wherein the internal clock period is designed to match a worst-case delay of an internal pipeline logic of the second processing unit.

12. The apparatus of claim 1, wherein the second processing unit includes a clock synchronous logic and a second first-in-first-out register to send an output clock and a packet of data to the first processing unit.

* * * * *